US012568447B2

(12) United States Patent     (10) Patent No.:   US 12,568,447 B2

Desai et al.     (45) Date of Patent:    Mar. 3, 2026

(54) POWER BUDGET-BASED MESH TREE RECONFIGURATIONS

(71) Applicant: Cisco Technology, Inc., San Jose, CA (US)

(72) Inventors: Vishal Satyendra Desai, San Jose, CA (US); Robert E. Barton, Richmond (CA); Alessandro Erta, Licciana Nardi (IT)

(73) Assignee: Cisco Technology, Inc., San Jose, CA (US)

( * ) Notice: Subject to any disclaimer, the term of this patent is extended or adjusted under 35 U.S.C. 154(b) by 590 days.

(21) Appl. No.: 18/108,179

(22) Filed: Feb. 10, 2023

(65) Prior Publication Data

US 2024/0276398 A1     Aug. 15, 2024

(51) Int. Cl.
| | |
|---|---|
| *H04W 52/36* | (2009.01) |
| *H04W 52/02* | (2009.01) |
| *H04W 52/32* | (2009.01) |

(52) U.S. Cl.
CPC ..... H04W 52/367 (2013.01); H04W 52/0203 (2013.01); H04W 52/32 (2013.01)

(58) Field of Classification Search
CPC ........... H04W 52/367; H04W 52/0203; H04W 52/32; H04W 52/46
See application file for complete search history.

(56) References Cited

U.S. PATENT DOCUMENTS

| | | | | |
|---|---|---|---|---|
| 8,768,371 | B2 * | 7/2014 | Chaudhri | ............ H04W 72/541 |
| | | | | 455/452.2 |
| 9,325,516 | B2 | 4/2016 | Pera et al. | |
| 2011/0237289 | A1 * | 9/2011 | Fodor | ................. H04W 52/367 |
| | | | | 455/522 |
| 2012/0083201 | A1 * | 4/2012 | Truong | ................. H04W 52/46 |
| | | | | 455/9 |
| 2014/0200046 | A1 * | 7/2014 | Sikri | .................... H04B 17/345 |
| | | | | 455/552.1 |
| 2015/0117407 | A1 * | 4/2015 | Hogan | .............. H04W 36/0072 |
| | | | | 370/331 |
| 2018/0157315 | A1 * | 6/2018 | Ehsan | ................... G06F 1/3296 |

(Continued)

FOREIGN PATENT DOCUMENTS

| | | |
|---|---|---|
| KR | 20100090489 A | 8/2010 |
| WO | 2022045851 A1 | 3/2022 |

OTHER PUBLICATIONS

Xie, et al., "Adaptive Transmission Power in Low-Power and Lossy Network", Defensive Publication Series, Technical Disclosure Commons, (Sep. 25, 2018), 7 pages.

(Continued)

*Primary Examiner* — Dominic E Rego

(74) *Attorney, Agent, or Firm* — Lee & Hayes, P.C.

(57) ABSTRACT

According to one or more embodiments of the disclosure, an example process herein may comprise: identifying a power budget threshold to maintain existing mesh backhaul links in a mesh tree; determining an estimated power budget among potential mesh backhaul links in the mesh tree; performing a channel evaluation of each candidate channel available to establish a backhaul link in the mesh tree; and reconfiguring the mesh tree, in response to a modified power budget for the mesh tree, wherein reconfiguring is based on the estimated power budget and the channel evaluation.

20 Claims, 8 Drawing Sheets

(56)          References Cited

U.S. PATENT DOCUMENTS

| | | | | |
|---|---|---|---|---|
| 2018/0300839 | A1* | 10/2018 | Appu | G06T 1/60 |
| 2020/0236634 | A1* | 7/2020 | Sridharan | H04W 52/367 |
| 2021/0321340 | A1* | 10/2021 | Krenz | H04W 72/0473 |
| 2021/0344543 | A1* | 11/2021 | Sahraei | H04L 27/2618 |
| 2021/0344738 | A1 | 11/2021 | Petrie et al. | |
| 2021/0352714 | A1* | 11/2021 | Gao | H04W 74/002 |
| 2022/0030334 | A1 | 1/2022 | Stamatakis et al. | |
| 2023/0231640 | A1* | 7/2023 | Balevi | H04B 7/0426 |
| | | | | 370/329 |
| 2025/0247799 | A1* | 7/2025 | Bertizzolo | H04W 52/146 |

OTHER PUBLICATIONS

Reynolds, Karl, "Portable Modular Node Mesh Network Distribution System", Defensive Publications Series, Technical Disclosure Commons, ( Jan. 17, 2017), 3 pages.
Jiang, et al., "Fast Forwarding Routing Mechanism Based on Network Topology for Wireless Sensor Network", Defensive Publications Series, Technical Disclosure Commons, (Mar. 20, 2020), 6 pages.
"FCC Fact Sheet—The Commission Begins the Process for Authorizing 6 GHz Band Automated Frequency Coordination Systems", Public Notice—ET Docket No. 21-352, Sep. 9, 2021, 7 pages, Federal Communications Commission.

* cited by examiner

POWER BUDGET-BASED MESH TREE RECONFIGURATIONS

TECHNICAL FIELD

The present disclosure relates generally to computer networks, and, more particularly, power budget-based mesh tree reconfigurations.

BACKGROUND

As adoption and deployment of wireless data communication devices has expanded, the capacity of legacy wireless connectivity technology to serve these devices has been overwhelmed. For example. Wi-Fi communication channels in the 2.4 GHz band and the 5 GHz band commonly suffer from congestion with too many access points and clients sharing the same channel, especially in areas of dense deployment. In response, the 6 GHz band has been opened for Wi-Fi use.

The 6 GHz band represents 1200 MHz of spectrum available from 5.925 GHz to 7.125 GHz providing access to fifty-nine 20-MHz channels, twenty-nine 40-MHz channels, fourteen 80-MHz channels, and seven 160-MHz channels. Operated according to the IEEE 802.1 lax standard and marketed as Wi-Fi 6E, this expansion of Wi-Fi spectrum offers an enhancement in throughput-per-area over the legacy spectrum.

Regulatory bodies have defined two radio power modes for access points utilizing this portion of the Wi-Fi spectrum: standard power (SP) mode and low power indoor (LPI) mode. Conditional operating restrictions apply to the devices operating in these modes. For example, SP access points can operate in only a portion of the 6 GHz band indoors or outdoors at full power, while LPI access points are able to operate across the entire the 6 GHz band at a lower power and only indoors.

In order to preserve the access of incumbent users to this portion of the spectrum, regulatory bodies (e.g., the FCC) have mandated use of an interference mitigation system to protect these incumbents, called Automated Frequency Coordination (AFC) system. The AFC system may, when there is a chance of interference with an incumbent, reduce the power of an SP radio to reduce that chance of interference with the incumbent. Unfortunately, these power reductions can completely disrupt mesh trees by, for example, reducing communication ranges among the nodes of the mesh trees.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device may identify a power budget threshold to maintain existing mesh backhaul links in a mesh tree; determine an estimated power budget among potential mesh backhaul links in the mesh tree; perform a channel evaluation of each candidate channel available to establish a backhaul link in the mesh tree; and reconfigure the mesh tree, in response to a modified power budget for the mesh tree, wherein reconfiguring is based on the estimated power budget and the channel evaluation.

Other embodiments of the present disclosure may be discussed in the detailed description below, and the summary above is not meant to be limiting to the scope of the invention herein.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computer network.
Figure 1:
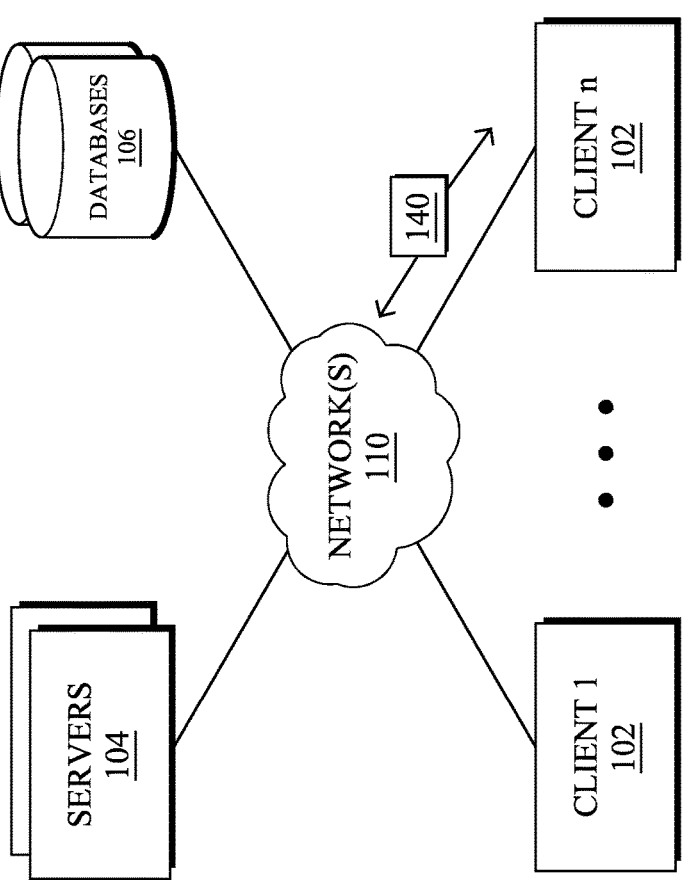

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to pre-defined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
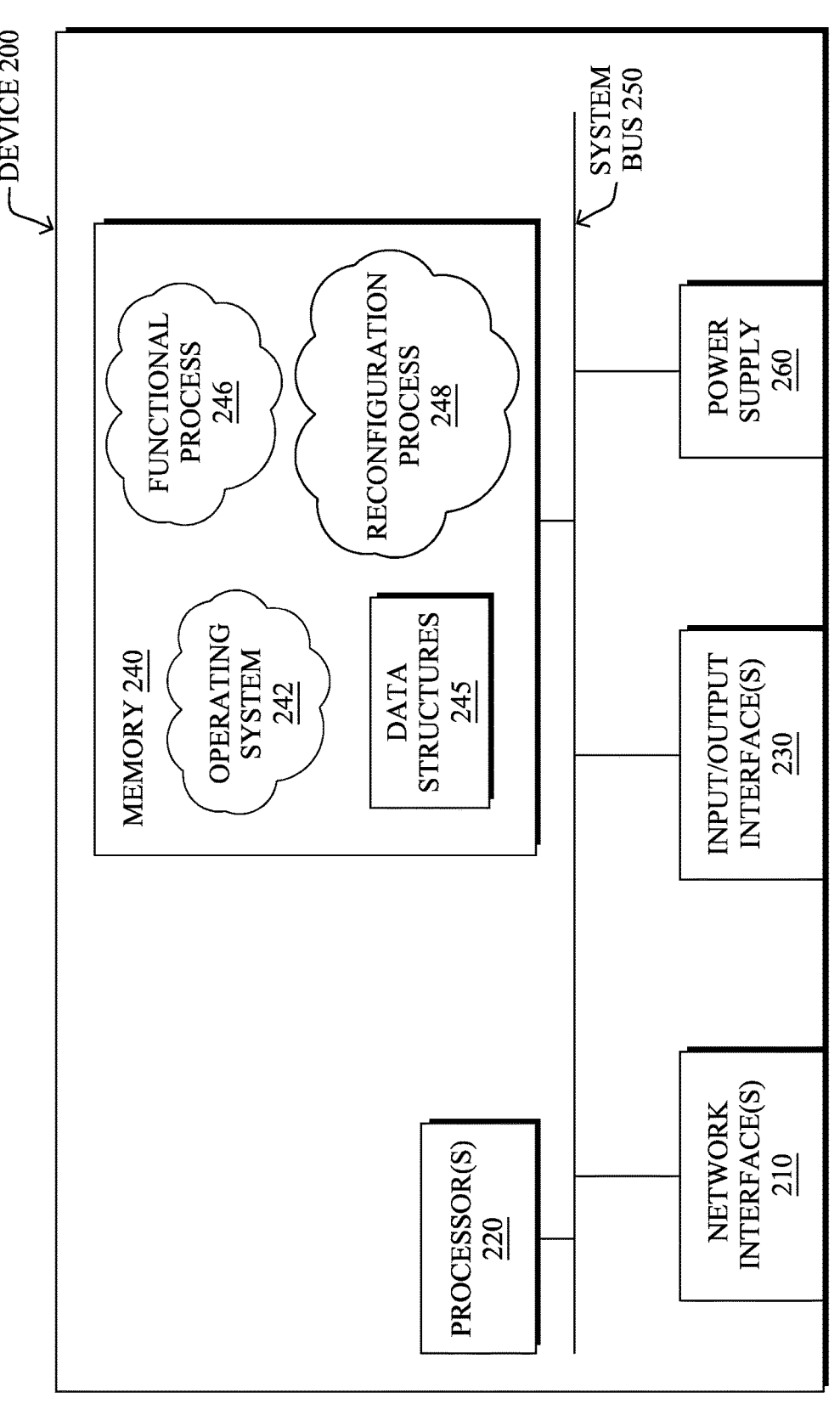
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (110) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, reconfiguration process 248, as described herein. Notably, the one or more functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
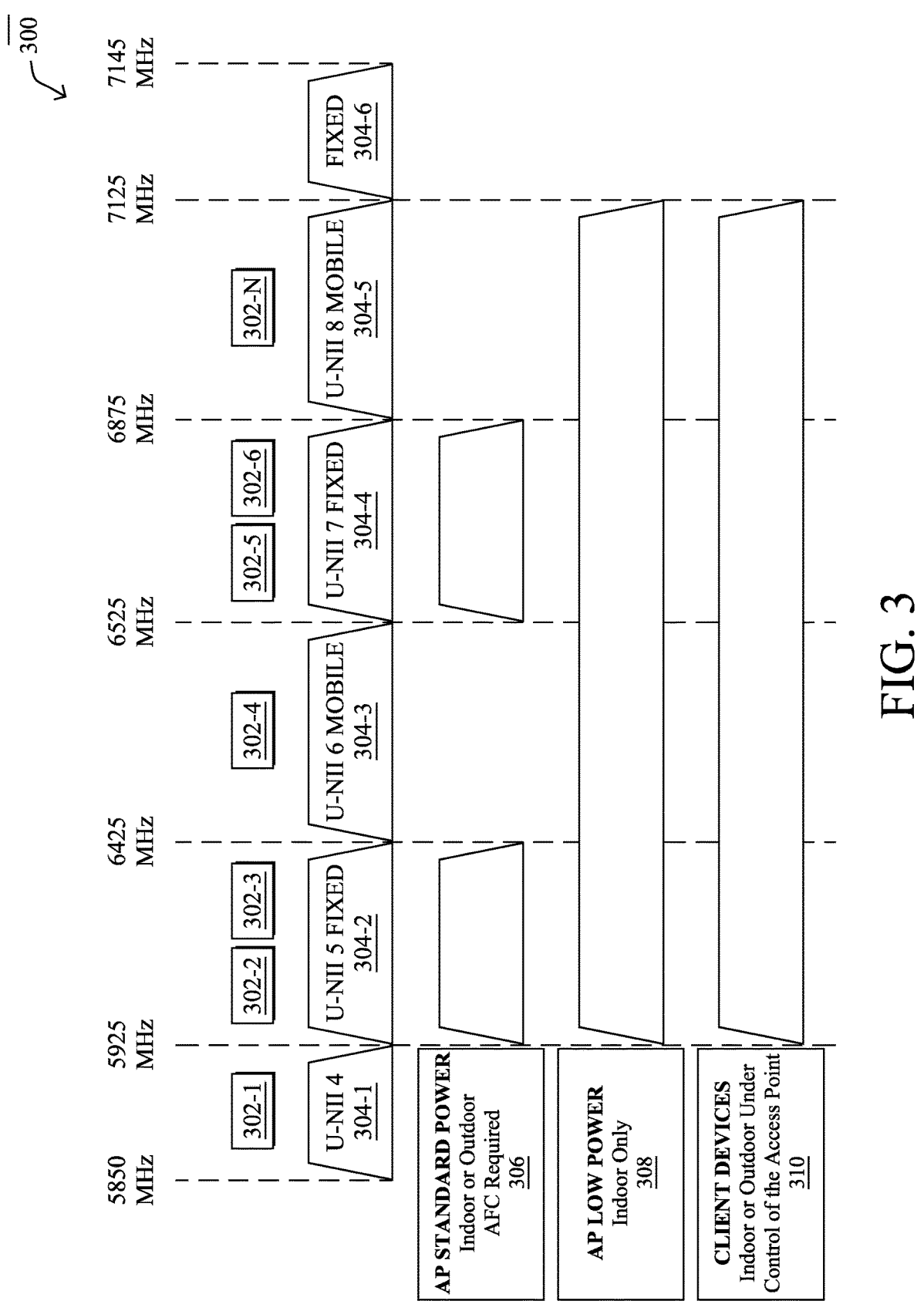
FIG. 3 illustrates an example of a band segmentation of the 6 GHz band for Wi-Fi use.

FIG. 3 illustrates an example of a band segmentation 300 of the 6 GHz band for Wi-Fi use, according to various embodiments. As previously noted, regulatory agencies have established rules regarding operation of unlicensed devices, like Wi-Fi devices, on the 6 GHz band. These rules are largely in place to preserve access to the band by incumbent users 302 (e.g., 302-1 . . . 302-N).

The 6 GHz band is itself segmented into bands 304 (e.g., 304-1 . . . 304-6). The bands 304 include a variety of unlicensed national information infrastructure (U-NII)

bands. These bands 304 may correspond to use by incumbent users 302. For example, U-NII 5 band 304-2, including the portion of the 6 GHz band running from 5925 MHz to 6425 MHz, and U-NII 7 band 304-4, including the portion of the 6 GHz band running from 6525 MHz to 6875 MHz, are primarily used for fixed service incumbents. For instance, U-NII 5 band 304-2 and U-NII 7 band 304-4 are utilized by satellite link communications to geostationary satellites, point-to-point microwave links deployed by carriers for wireless backhaul, and/or critical services like utilities, as well as public safety and emergency services. U-NII 6 band 304-3, including the portion of the 6 GHz band running from 6425 MHz to 6525 MHz, and U-NII 8 band 304-5, including the portion of the 6 GHz band running from 6875 MHz to 7125 MHz, are primarily used for mobile service incumbents, such as mobile trucks used by the news crews to relay the signal back to the TV studio.

Incumbent users 302 may represent critical users, and therefore the rules of operation defined by regulators for unlicensed devices serve to ensure that these devices don't produce harmful interference to incumbent users 302. These rules limit how unlicensed devices such as access points and their clients can utilize the 6 GHz band. This has resulted in various classes of access points being defined to adapt to the U-NII bands and conditions where they will be operating. These classes correspond to radio power modes (e.g., standard, low, very low, etc.) by which the access points operation. The classes include the standard power access points (e.g., SP access points 306), the low power indoor access points (e.g., LPI access points 308), and very low power (VLP) access points.

Table I illustrates examples of the operational limitations assigned to each of the classes of access points.

TABLE I

EXPANDED UNLICENSED USE OF THE 6 GHz BAND:

| DEVICE CLASS | OPERATING BANDS | MAXIMUM EIRP | MAXIMUM EIRP POWER SPECTRAL DENSITY |
|---|---|---|---|
| Standard Power Access Point (AFC Controlled) | U-NII-5 U-NII-7 | 36 dBm | 23 dBm/MHz |
| Fixed Client (AFC Controlled) | | 36 dBm | 23 dBm/MHz |
| Client Connected to Standard Power Access Point | | 30 dBm | 17 dBm/MHz |
| Low Power Access Point (Indoor Only) | U-NII-5 U-NII-6 | 30 dBm | 5 dBm/MHz |
| Client Connected to Low Power Access Point | U-NII-7 U-NII-8 | 24 dBm | -1 dBm/MHz |

As is evident by Table I, SP access points 306 are permitted to operate in the U-NII 5 and U-NII 7 bands indoors or outdoors at full power. SP access points 306 may have a maximum effective isotropic radiated power (EiRP) of 36 dBm.

Conversely, LPI access points 308 may operate across the entire 6 GHz band (U-NII 5, U-NII 6, U-NII 7 and U-NII 8) and are intended for indoor operation only. LPI access points 308 may have a maximum EiRP of 30 dBm. To ensure that LPI access points 308 remain indoors, these devices may not have weather resistant enclosures, may not operate on battery power, and/or may have integrated antennas with a design that prevents the installation of external antennas.

Indoor access points with external antennas may be prohibited from operating in LPI mode.

Since many incumbents currently use this band, regulatory bodies have mandated an interference mitigation system to protect access for these incumbents. This system may be referred to as an Automated Frequency Coordination (AFC) system. Access points (e.g., SP access points, SP indoors (SPI) access points, etc.) may consult an AFC system to ensure that they are compliant with their corresponding operational limitations and that their operation will not interfere with an incumbent. The AFC system may assign a list of frequencies and/or a budget of power consumption (e.g., allowed power budget) to a consulting access point, based on how it's radio can be operated in a particular radio power mode with a lowered risk of interfering with any incumbent fixed microwave receiver.

LPI access points 308 may operate without AFC consultation. Likewise, client devices 310 don't need to utilize the AFC system since they must follow the access point that they're connected. Since the access point that its following will either be operating under AFC or not, depending on its operational configuration, client devices do not need to concern themselves with AFC system coordination.

Conversely, SP access points 306 are required to operate under the control of the AFC system. For instance, prior to transmitting an access point operating it radio in SPI power mode must first consult an AFC system to ensure that it is compliant and will not interfere with an incumbent. If an incumbent exists, the radio cannot transmit at the maximum EIRP, but must reduce its power to reduce the chance of interference, thereby greatly reducing its range. All of this may be done to ensure that the transmissions of that access point don't exceed an interference-to-noise-ratio by more than -6 dB.

Many IoT Mesh Products, including those operating on Wi-Fi 6E spectrum, include outdoor access points and/or access points that have external antennas. Both these classes of access points will be mandated to coordinate with an AFC system and required to report access point geolocation information to determine their allowed power budget every twenty-four hours. The allowed power budget may specify the maximum permissible power usage for the access points (e.g., an EiRP limit). The allowed power budget may be modified and/or vary over time as conditions and/or incumbent presence changes.

As noted above, and unlike its predecessors in 2.4 GHz band and 5 GHz band, this variability in EiRP associated with the 6 GHz band may lead to many concerns for mesh sectors. For instance, lower EiRP budgets can completely disrupt a mesh tree. For example, a reduction in EiRP budgets may impact backhaul range of nodes in the mesh. As a result, mesh backhaul links may be eliminated leading to a loss of mesh backhaul capability in a mesh tree and/or a failure of the mesh tree.

Power Budget-Based Mesh Tree Reconfigurations

The techniques herein, therefore, introduce a method to mitigate the disruptive impacts of power budget variability resulting from AFC system power budget updates for indoor and/or outdoor wireless backhaul access points. The method may mitigate the disruptions by identifying minimum link power budget (MLPB) requirements within the mesh sector and dynamically transitioning mesh tree configurations based on revised power budget updates provided by an AFC system.

Specifically, according to one or more embodiments described herein, an example process herein may comprise: identifying a power budget threshold to maintain existing mesh backhaul links in a mesh tree; determining an estimated power budget among potential mesh backhaul links in the mesh tree; performing a channel evaluation of each candidate channel available to establish a backhaul link in the mesh tree; and reconfiguring the mesh tree, in response to a modified power budget for the mesh tree, wherein reconfiguring is based on the estimated power budget and the channel evaluation.

Figure 4:
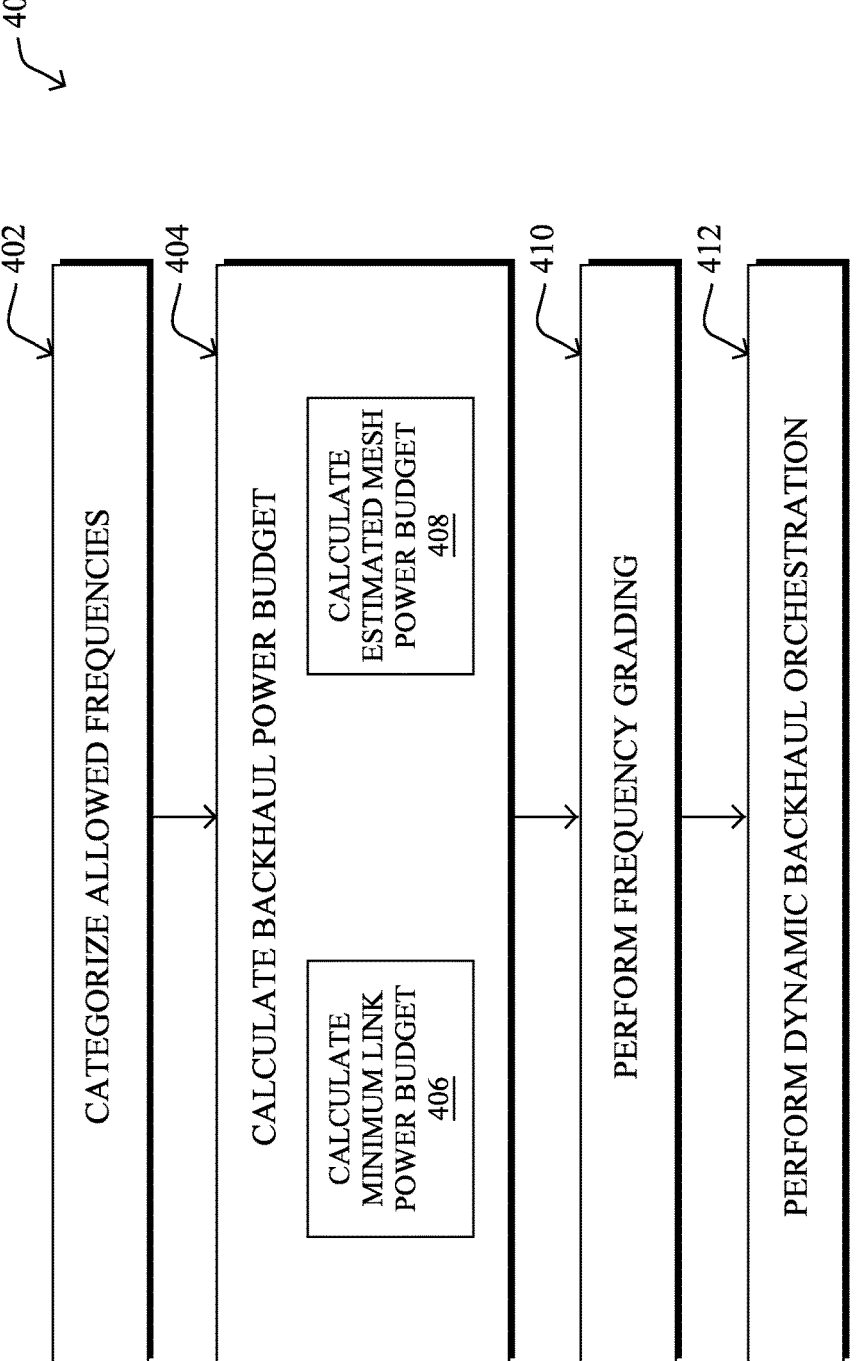
FIG. 4 illustrates an example of a process flow for power budget-based mesh tree reconfigurations.

Operationally, FIG. 4 illustrates an example of a process flow 400 for power budget-based mesh tree reconfigurations, according to various embodiments. Specifically, process flow 400 illustrates an example of steering logic for dynamically preserving mesh backhaul links by managing mesh tree configurations throughout allowed power budget revisions. Process flow 400 may be partially or entirely executed by an access point in a mesh tree, a network controller, a radio configuration system, and/or a computing device communicatively coupled to the access points of a mesh tree, a network controller, and/or an AFC system database.

Process flow 400 may include categorizing allowed frequencies 402. Categorizing allowed frequencies 402 may include creating a list of total allowed frequencies for a given regulatory domain. The total allowed frequencies of this list may be classified into two or more classes. For example, the total allowed frequencies may be classified as LPI-bound frequencies. LPI-bound frequencies may include frequencies within the U-NII-6 and/or the U-NII-8 portions of the 6 GHz band. Alternatively, the total allowed frequencies may be classified as SP/SPI-mandated frequencies. SP/SPI-mandated frequencies may be frequencies in the U-NII-5 and/or the U-NII-7 portions of the 6 GHz band.

The LPI-bound frequencies may also support a fixed power spectral density (PSD). A fixed power spectral density may help nullify a noise figure (NF) increase occurring over a wider channel. Nullifying NF may help maintain a signal-to-interference and noise ratio (SiNR) for a mesh backhaul. While SP/SPI access points may have variable PSD, they may potentially allow much higher power levels thus leading to better reception of the mesh backhaul. Furthermore, based on the presence of an incumbent, a subset of frequencies within the U-NII-5 and/or the U-NII-7 spectrums may either not allow Wi-Fi transmissions (e.g., due to interference impact) or may support a very low power budget. Such frequencies may be trimmed from the classes of allowed frequencies when categorizing allowed frequencies 402.

Process flow 400 may include calculating a backhaul power budget 404. Calculating a backhaul power budget 404 may include computing power budget requirements between the existing and/or potential mesh backhaul links in a mesh tree. In various embodiments, computing power budget requirements in a mesh tree may include one or more of calculating a minimum link power budget 406 for the existing mesh backhaul links and/or calculating an estimated mesh power budget 408 for potential mesh backhaul links.

Calculating a minimum link power budget 406 may include computing the minimum link power budget (MLPB) between the existing backhaul mesh links. A MLPB may represent a minimum mandatory power budget required to maintain mesh backhaul link. The MLPB may be based on the spatial proximity between the mesh nodes supporting the link. The MLPB may be calculated based on a rate verses range (RvR) throughput assessment of the nodes of the existing mesh backhaul links in the mesh tree. Additionally, the MLPB may be calculated based on a minimum SiNR requirements of a mesh backhaul to meet application service level agreements (SLAs) between the wireless backhaul mesh access points. The MLPB calculations may also consider non-Wi-Fi interference and its impacts on the amount of background noise for a link.

Calculating an estimated mesh power budget 408 may include computing an estimated mesh power budget (EPB) between non-exiting backhaul mesh links and/or nodes that could potentially act as a mesh backhaul link node regardless of whether they are presently acting as a mesh backhaul link. An EPB may be calculated based on the mesh access points' spatial proximity as determined by mesh beacons. Other forms of neighbor discovery may be used such as via reverse path loss (PL) calculations from management and/or control frames such as 802.11 management and/or control frames.

Process flow 400 may include performing frequency grading 410. Performing frequency grading 410 may include evaluating 6 GHz operational frequencies that may be used by mesh nodes to support a backhaul mesh link and grading those frequencies based on channel state information (CSI) metrics along with an allowed EiRP budget. Therefore, while Wi-Fi and/or non-Wi-Fi interference measurements may be considered to determine channel quality, additionally considering the allowed EiRP budget prevents switching to a cleaner channel that ultimately doesn't have the necessary EiRP budget (e.g., due to a presence of nearby incumbent). For example, channels that lack the necessary EiRP budget to sustain a mesh backhaul link may be deprioritized for mesh backhaul candidacy selection despite having less interference that some higher prioritized channels.

Furthermore, a radio configuration system (such as, e.g., a Fluidmesh centralized Radio Configuration Environment or "RACER/Racer Cloud", available from Cisco Systems, Inc.) may also monitor variance in EiRP budgets over longer time windows. An SP operated frequency with an EiRP budget that demonstrates significant variability (e.g., more than a threshold amount of variation over a period of time) may also be deprioritized as such variability may lead to mesh tree disruptions and/or backhaul link loss. Frequency grading may be conducted every twenty-four hours (or more or less frequently) based on AFC system responses.

Process flow 400 may include performing dynamic backhaul orchestration 412. Performing dynamic backhaul orchestration 412 may include monitoring allowed power budget changes issued by the AFC system (e.g., every twenty-four hours, more or less frequently than every twenty-four hours, etc.) and ensuring that a mesh tree undergoes minimal changes and/or that backhaul links are established or sustained despite the power budget variations by the AFC system.

For example, performing dynamic backhaul orchestration 412 may include comparing an MLPB between existing mesh backhaul links and/or with the EPB between future/potential mesh links with a revised allowed power budget consideration from the AFC system. If the existing allowed power budget is less than the MLPB threshold, then a split in the mesh tree may be triggered and/or a new tree may be reformed based on the EPB and revised allowed power budget considerations. For example, the mesh tree may be reconfigured such that backhaul links are established across nodes associated with an EPB that is less than or equal to the revised allowed power budget. This reconfiguration may occur responsive to the revised allowed power budget from an AFC system falling below the MLPB required to sustain one or more existing backhaul links.

Figure 5:
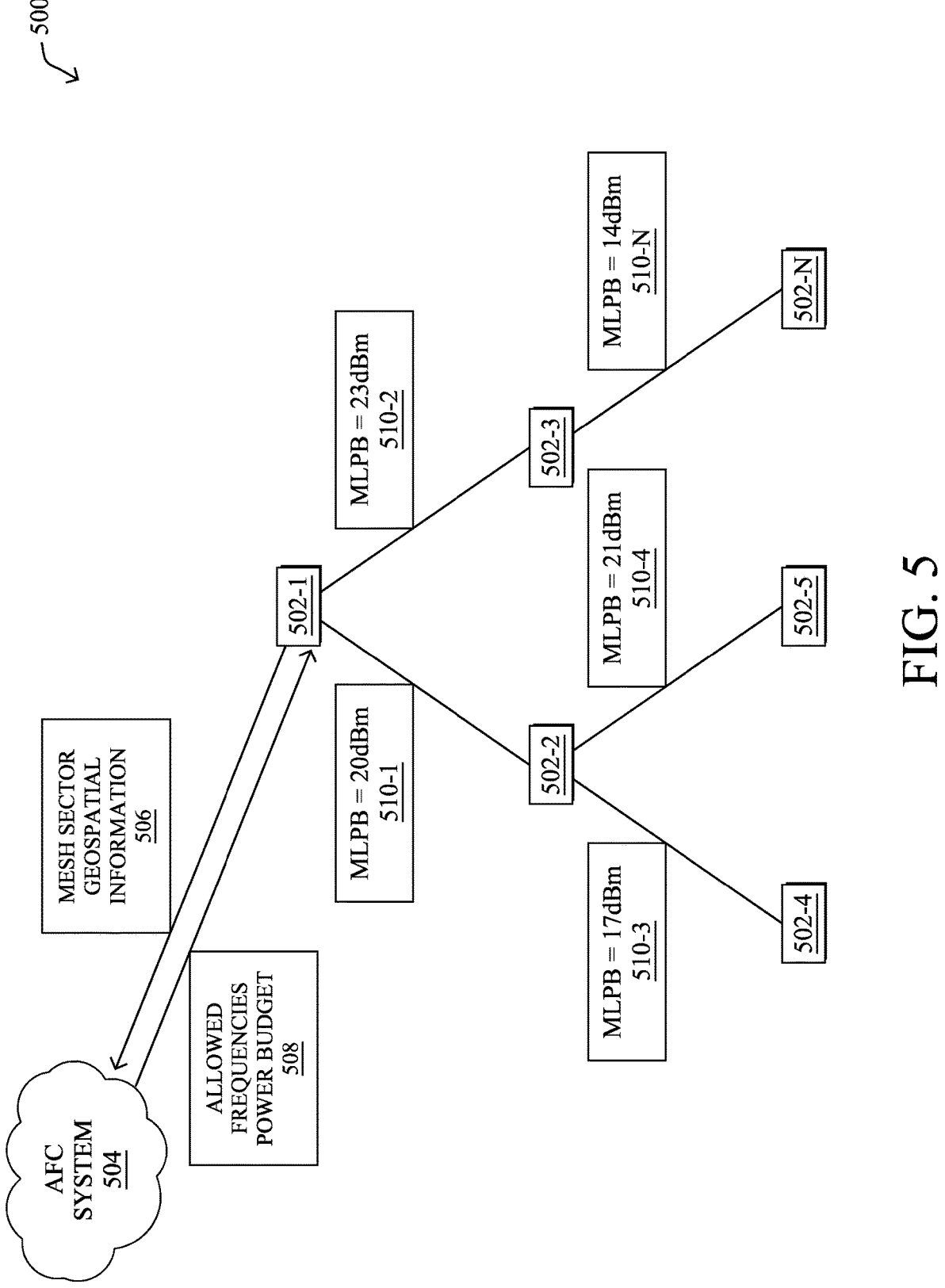
FIG. 5 illustrates an example of a mesh tree of access points along with corresponding minimum link power budgets (MLPBs)

FIG. 5 illustrates an example of a mesh tree deployment 500 of access points 502 (e.g., 502-1 . . . 502-N) along with corresponding MLPBs 510 (e.g., 510-1 . . . 510-N) computed for each existing backhaul link, in accordance with one or more embodiments described herein. Mesh tree deployment 500 may include access points 502 arranged in a mesh network topology where the access points 502 are nodes in a tree network structure where they are linked together and/or branch off from other nodes. The access points 502 may be wireless backhaul access points that provide low-latency wireless backhaul for operational technology and information technology mobility and/or fixed applications.

These communication links between the access points 502 may be wireless backhaul links for a 6 GHz Wi-Fi network deployment. Wireless backhaul links may provide communication pathways between a mesh Wi-Fi system's first node (e.g., a main router node, a core node, a backbone node, a hub node, a connection source node for connection to a communication network such as the Internet, a mobile data network, a telecommunications network, etc.) (e.g., access point 502-1) and one or more other satellite node access points (e.g., 502-2 . . . 502-N). In essence, the backhaul links may communicatively connect satellite nodes of a sub-network (e.g., at the edge of a core network) back toward the core network. The backhaul communication links may operate across a dedicated Wi-Fi backhaul band so that the backhaul connection doesn't compete with client devices for network bandwidth. However, incumbent interference considerations may still exist within the band.

Access points 502 may operate their radios in an SP and/or SPI power mode. That is, the illustrated existing wireless backhaul links in the mesh tree deployment 500 may be established among radios of the access points 502 that are configured to operate in an SP and/or an SPI power mode. As such, access points 502 may be mandated to coordinate their operations with an AFC system 504.

This coordination may include communication of mesh sector geospatial information 506 of each of the access points 502 to AFC system 504. The AFC system 504 may determine and/or provide allowed frequencies and/or allowed power budgets 508 back to the access points 502. The access points 502 may adjust the operation of their radios accordingly.

As previously described, the properties of the mesh tree deployment 500 and/or its constituent components (e.g., access points 502) may be utilized to mitigate the deleterious effects of power budget variability on establishing and/or sustaining wireless backhaul links. For instance, MLPBs 510 may be calculated for each backhaul link (e.g., calculating minimum link power budget 406 by process flow 400 illustrated in FIG. 4).

As also previously described, MLPBs 510 may represent minimum mandatory power budgets for access point radios that are required to maintain a corresponding mesh backhaul link based on the spatial proximity between the communicating mesh nodes. The MLPBs 510 may be calculated based on the RvR between access points 502 or comprehensively computed as minimum SiNR requirements of a mesh backhaul link to meet application SLAs between corresponding access points. The MLPBs 510 value may also reflect the impact of non-WiFi interference and its impact on the background noise levels.

Figure 6:
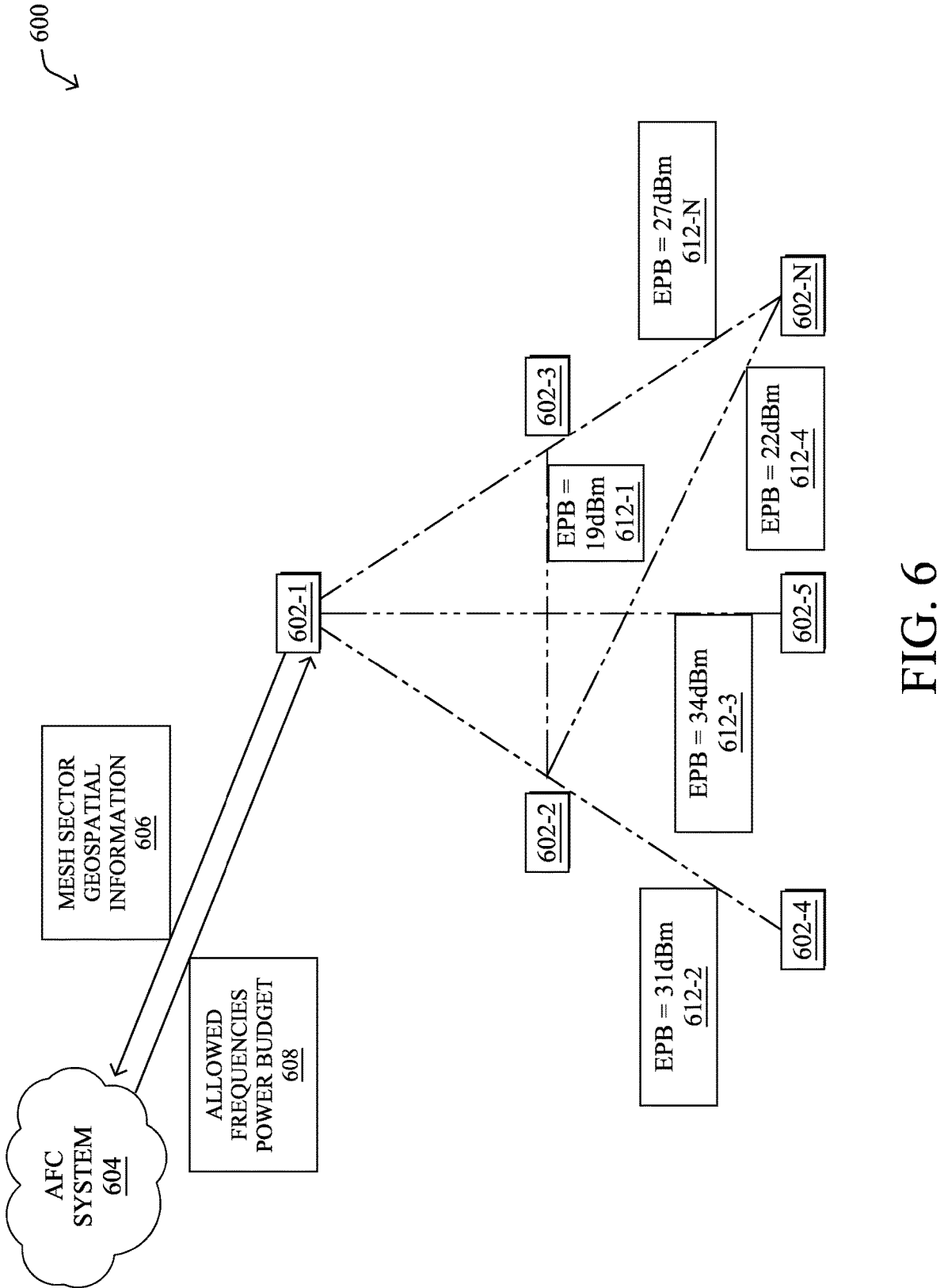
FIG. 6 illustrates an example of a mesh tree deployment of access points along with corresponding estimated link power budgets (EPBs)

FIG. 6 illustrates an example of a mesh tree deployment 600 of access points 602 (e.g., 602-1 . . . 602-N) along with corresponding EPBs 612 (e.g., 612-1 . . . 612-N) computed for each potential backhaul link, in accordance with one or more embodiments described herein. The potential backhaul links may be not-yet-existing backhaul links between the access point 602.

Access points 602 may be operating their radios in an SP and/or an SPI power mode. As such, these access points 602 may provide mesh sector geospatial information 606 to AFC system 604 and receive allowed frequencies and/or allowed power budgets 608 in return by which to configure their operations.

As described above, EPBs 612 may be calculated for each potential backhaul link (e.g., calculating estimated mesh power budget 408 by process flow 400 illustrated in FIG. 4). The EPBs 612 may represent estimated minimum mandatory power budgets for access point radios that are required to maintain a corresponding potential mesh backhaul link between the communicating mesh nodes. The EPBs may be calculated based on their constituent communicating access points' spatial proximity as determined by mesh beacons, reverse PL calculations from the 802.11 management and/or control frames, etc.

Figure 7:
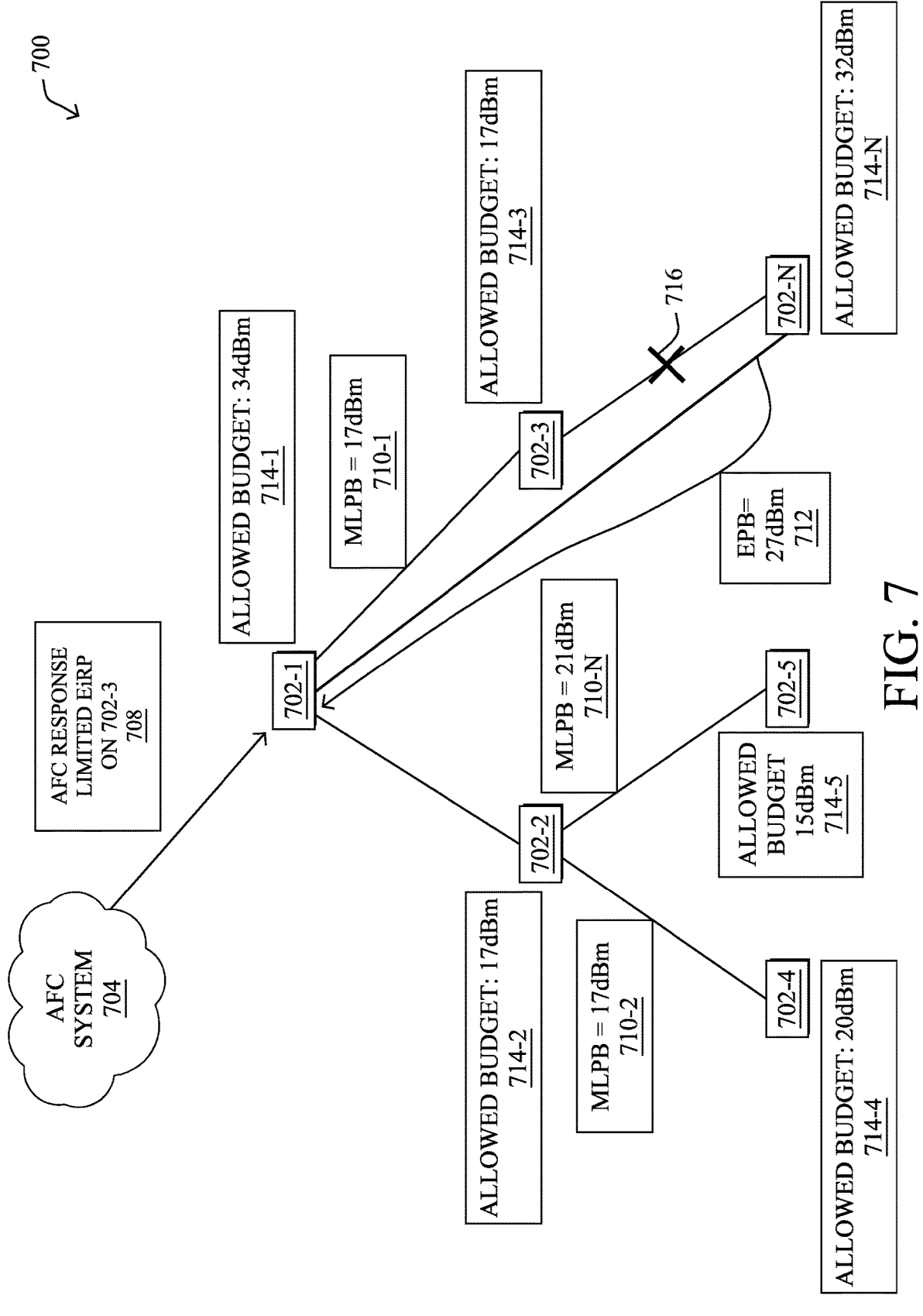
FIG. 7 illustrates an example of a mesh tree deployment of access points undergoing a power budget-based reconfiguration.

FIG. 7 illustrates an example of a mesh tree deployment 700 of access points 702 (e.g., 702-1 . . . 702-N) undergoing a power budget-based reconfiguration, in accordance with one or more embodiments described herein. The mesh tree deployment 700 of access points 702 interfacing with AFC system 704 may be reconfigured in response to an AFC response 708 to access points 702.

For example, AFC system 704 may issue an AFC response 708 that provides new and/or modified allowed power budgets 714 (e.g., 714-1 . . . 714-N) to one or more of access points 702. For instance, AFC response 708 may provide a modified allowed power budget (e.g., 714-3) that is a reduced and/or limited EiRP for a particular access point (e.g., 702-3).

A mesh backhaul orchestrator (e.g., one or more devices executing one or more portions of process flow 400) may monitor AFC responses and/or power budget modifications and/or may compare the modified allowed power budgets 714 to corresponding MLPBs 710 (e.g., 710-1 . . . 710-N) for existing backhaul links. Additionally, the mesh backhaul orchestrator may compare the modified allowed power budgets 714 to an EPB 712 of potential mesh backhaul links. If a modified allowed power budget 714 falls below its corresponding MLPB, then a mesh backhaul orchestrator may reconfigure (e.g., reorganize link relationships, perform tree splitting, reform a new tree, etc.) mesh tree deployment 700 to prevent mesh backhaul degradation and/or loss by introducing a new mesh backhaul link and/or mesh backhaul communication relationship between access points 702 that are indicated as having an EPB 712 that can sustain the new link given the modified allowed power budgets 714.

For example, in mesh tree deployment 700 a mesh backhaul orchestrator may recognize that a modified allowed power budget (e.g., 714-3) from the AFC system 704 for a particular access point (e.g., 702-3) does not meet or exceed the MLPB for sustaining an existing backhaul link involving that particular access point (e.g., 702-3). In response, the mesh backhaul orchestrator may trigger a disjoint 716 between the particular access point (e.g., 702-3) and one or more other access points (e.g., 702-N) that are acting as nodes in the existing backhaul link.

The mesh backhaul orchestrator may reconfigure mesh tree deployment 700 to establish a new communication branch 718 directly between another access point (e.g., 702-1) and the one or more other access points (e.g., 702-N). The new communication branch 718 may be identified and/or established based on an allowed power budget (e.g., 714-N) between the operation frequencies of access point (e.g., 702-1) and the one or more other access points (e.g., 702-N) meeting or exceeding an EPB 712 requirement for establishing and/or sustaining a backhaul link among those access points. The backhaul orchestrator may also consider adjacent frequency's EiRP budget to maximize mesh backhaul channel bandwidth when identifying and/or establishing the new communication branch 718.

Figure 8:
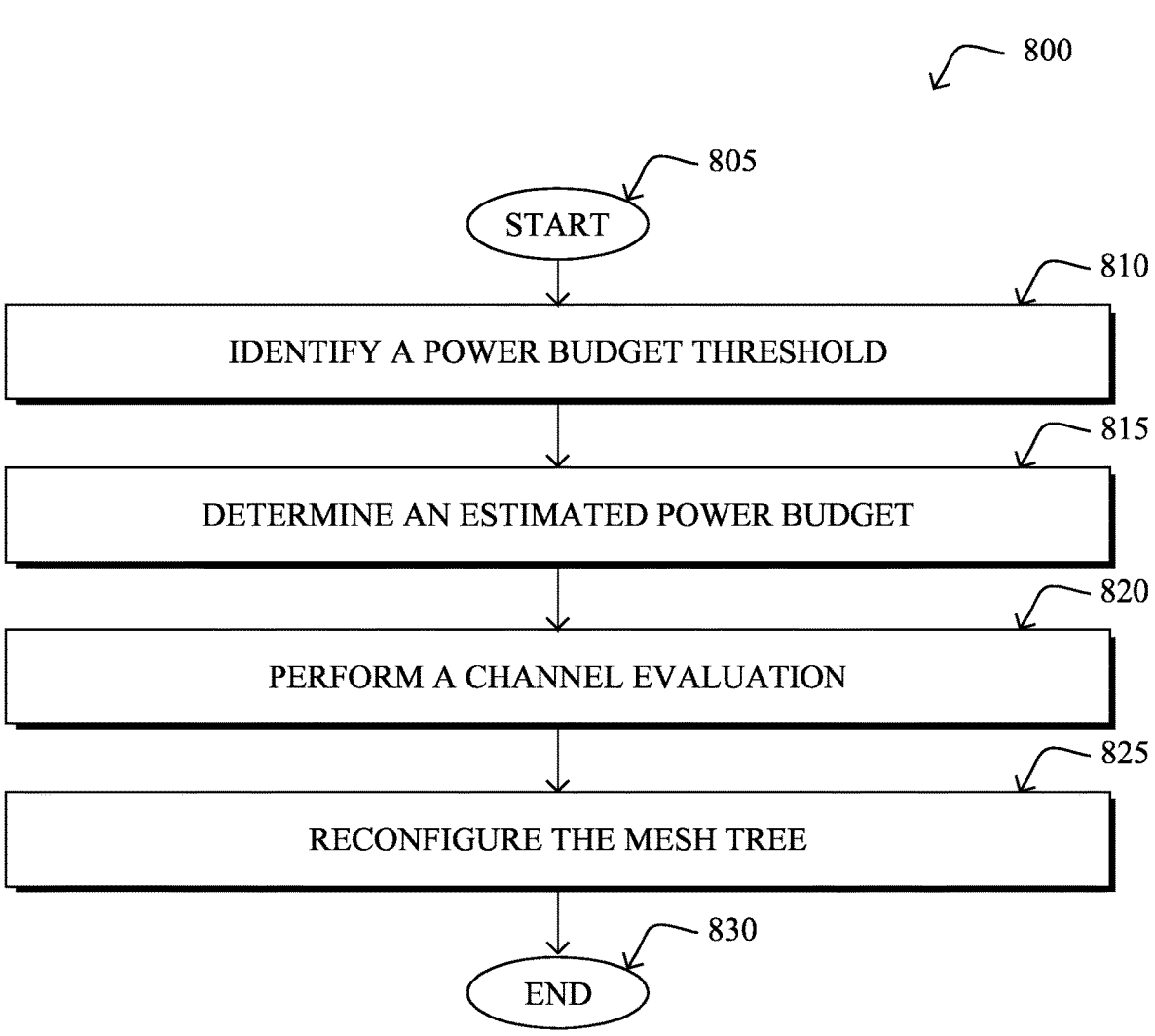
FIG. 8 illustrates an example simplified procedure for power budget-based mesh tree reconfigurations.

FIG. 8 illustrates an example simplified procedure (e.g., a method) for power budget-based mesh tree reconfigurations, in accordance with one or more embodiments described herein. For example, a non-generic, specifically configured device (e.g., device 200), may perform procedure 800 by executing stored instructions (e.g., reconfiguration process 248). The procedure 800 may start at step 805, and continues to step 810, where, as described in greater detail above, a device may identify a power budget threshold to maintain existing mesh backhaul links in a mesh tree.

The power budget threshold may be a minimum mandatory power budget to maintain the existing mesh backhaul links based on a spatial proximity between nodes of the existing mesh backhaul links in the mesh tree. The power budget threshold may be calculated based on an RvR throughput assessment of the nodes of the existing mesh backhaul links in the mesh tree. Additionally, or alternatively, the minimum mandatory power budget to maintain the existing mesh backhaul links may be identified based on a minimum signal to interference and noise ratio (SiNr) for the existing mesh backhaul links to meet application SLAs between the nodes of the existing mesh backhaul links in the mesh tree.

At step 815, as detailed above, the device may determine an estimated power budget among potential mesh backhaul links in the mesh tree. The estimated power budget among the potential mesh backhaul links in the mesh tree may be determined based on a spatial proximity between nodes of non-existing mesh backhaul links in the mesh tree as determined from mesh beacons associated with the nodes. Additionally, or alternatively, the estimated power budget among the potential mesh backhaul links in the mesh tree may be determined based on a spatial proximity between nodes of non-existing mesh backhaul links in the mesh tree as determined from reverse path loss calculations based on at least one of a management frame or a control frame associated with the nodes.

At step 820, as detailed above, the device may perform a channel evaluation of each candidate channel available to establish a backhaul link in the mesh tree. Performing the channel evaluation may include assigning a frequency grade to each candidate channel, wherein the frequency grade is based on CSI metrics and allowed EiRP budgets for each candidate channel. A candidate channel may be deprioritized for mesh backhaul candidacy selection in response to determining that the candidate channel has an insufficient allowed EiRP budget to establish the backhaul link in the mesh tree. Additionally, a candidate channel may be deprioritized for mesh backhaul candidacy selection in response to determining that the candidate channel has more than a threshold amount of variability to its allowed EiRP budget.

At step 825, as detailed above, the device may reconfigure the mesh tree, in response to a modified power budget for the mesh tree. The reconfiguration of the mesh tree may be formulated based on the estimated power budget and the channel evaluation. The modified power budget may be specified by and/or received from an automated frequency coordination. When the modified power budget violates the power budget threshold, this may trigger the reconfiguration of the mesh tree.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce techniques by which mesh tree structures can be dynamically reconfigured to mitigate the impact of EiRP variability on mesh backhaul reliability. By identifying MLPBs and EPBs for comparison tools against modified allowed power budgets and by performing frequency grading, these techniques support dynamic backhaul convergence in 6 GHz mesh tree deployments. As such, stable backhaul links may be established and/or maintained within these mesh tree deployments regardless of EiRP variability. Therefore, these techniques may improve the operation of network communications and/or data transmission across networks.

Illustratively, the techniques described herein may be performed by hardware, software, and/or firmware, such as in accordance with the reconfiguration process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the reconfiguration process 248.

According to the embodiments herein, an illustrative method herein may comprise: identifying, by a device, a power budget threshold to maintain existing mesh backhaul links in a mesh tree; determining, by the device, an estimated power budget among potential mesh backhaul links in the mesh tree; performing, by the device, a channel evaluation of each candidate channel available to establish a backhaul link in the mesh tree; and reconfiguring the mesh tree, by the device and in response to a modified power budget for the mesh tree, wherein reconfiguring is based on the estimated power budget and the channel evaluation.

In one embodiment, the power budget threshold is a minimum mandatory power budget to maintain the existing mesh backhaul links based on a spatial proximity between nodes of the existing mesh backhaul links in the mesh tree. In one embodiment, the power budget threshold is calculated based on a rate verses range (RvR) throughput assessment of the nodes of the existing mesh backhaul links in the mesh tree. In one embodiment, the minimum mandatory power budget to maintain the existing mesh backhaul links is identified based on a minimum signal to interference and noise ratio (SiNr) for the existing mesh backhaul links to meet application service level agreements (SLAs) between the nodes of the existing mesh backhaul links in the mesh tree.

In one embodiment, the estimated power budget among the potential mesh backhaul links in the mesh tree is based on a spatial proximity between nodes of non-existing mesh backhaul links in the mesh tree as determined from mesh beacons associated with the nodes. In one embodiment, the estimated power budget among the potential mesh backhaul links in the mesh tree is based on a spatial proximity between nodes of non-existing mesh backhaul links in the mesh tree as determined from reverse path loss calculations based on at least one of a management frame or a control frame associated with the nodes.

In one embodiment, performing the channel evaluation comprises: assigning a frequency grade to each candidate channel, wherein the frequency grade is based on channel state information (CSI) metrics and allowed effective isotropic radiated power (EiRP) budgets for each candidate channel. In one embodiment, performing the channel evaluation comprises: deprioritizing a candidate channel for mesh backhaul candidacy selection in response to determining that the candidate channel has an insufficient allowed effective isotropic radiated power (EiRP) budget to establish the backhaul link in the mesh tree. In one embodiment, performing the channel evaluation comprises: deprioritizing a candidate channel for mesh backhaul candidacy selection in response to determining that the candidate channel has more than a threshold amount of variability to its allowed effective isotropic radiated power (EiRP) budget. In one embodiment, the method may further comprise: receiving the modified power budget from an automated frequency coordination, wherein the modified power budget violates the power budget threshold.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: identify a power budget threshold to maintain existing mesh backhaul links in a mesh tree; determine an estimated power budget among potential mesh backhaul links in the mesh tree; perform a channel evaluation of each candidate channel available to establish a backhaul link in the mesh tree; and reconfigure the mesh tree, in response to a modified power budget for the mesh tree, wherein reconfiguring is based on the estimated power budget and the channel evaluation.

According to the embodiments herein, an illustrative tangible, non-transitory, computer-readable medium herein may have computer-executable instructions stored thereon that, when executed by a processor on a computer, may cause the computer to execute a process comprising: identifying a power budget threshold to maintain existing mesh backhaul links in a mesh tree; determining an estimated power budget among potential mesh backhaul links in the mesh tree; performing a channel evaluation of each candidate channel available to establish a backhaul link in the mesh tree; and reconfiguring the mesh tree, in response to a modified power budget for the mesh tree, wherein reconfiguring is based on the estimated power budget and the channel evaluation.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:

identifying, by a device, a power budget threshold to maintain existing mesh backhaul links in a mesh tree;

determining, by the device, an estimated power budget among potential mesh backhaul links in the mesh tree;

performing, by the device, a channel evaluation of each candidate channel available to establish a backhaul link in the mesh tree; and reconfiguring the mesh tree, by the device and in response to a modified power budget for the mesh tree, wherein reconfiguring is based on the estimated power budget and the channel evaluation.

2. The method as in claim 1, wherein the power budget threshold is a minimum mandatory power budget to maintain the existing mesh backhaul links based on a spatial proximity between nodes of the existing mesh backhaul links in the mesh tree.

3. The method as in claim 2, wherein the power budget threshold is calculated based on a rate verses range (RvR) throughput assessment of the nodes of the existing mesh backhaul links in the mesh tree.

4. The method as in claim 2, wherein the minimum mandatory power budget to maintain the existing mesh backhaul links is identified based on a minimum signal to interference and noise ratio (SiNr) for the existing mesh backhaul links to meet application service level agreements (SLAs) between the nodes of the existing mesh backhaul links in the mesh tree.

5. The method as in claim 1, wherein the estimated power budget among the potential mesh backhaul links in the mesh tree is based on a spatial proximity between nodes of non-existing mesh backhaul links in the mesh tree as determined from mesh beacons associated with the nodes.

6. The method as in claim 1, wherein the estimated power budget among the potential mesh backhaul links in the mesh tree is based on a spatial proximity between nodes of non-existing mesh backhaul links in the mesh tree as determined from reverse path loss calculations based on at least one of a management frame or a control frame associated with the nodes.

7. The method as in claim 1, wherein performing the channel evaluation comprises: assigning a frequency grade to each candidate channel, wherein the frequency grade is based on channel state information (CSI) metrics and allowed effective isotropic radiated power (EiRP) budgets for each candidate channel.

8. The method as in claim 1, wherein performing the channel evaluation comprises:
deprioritizing a candidate channel for mesh backhaul candidacy selection in response to determining that the candidate channel has an insufficient allowed effective isotropic radiated power (EiRP) budget to establish the backhaul link in the mesh tree.

9. The method as in claim 1, wherein performing the channel evaluation comprises:
deprioritizing a candidate channel for mesh backhaul candidacy selection in response to determining that the candidate channel has more than a threshold amount of variability to its allowed effective isotropic radiated power (EiRP) budget.

10. The method as in claim 1, further comprising:
receiving the modified power budget from an automated frequency coordination, wherein the modified power budget violates the power budget threshold.

11. An apparatus, comprising:
one or more network interfaces;
a processor coupled to the one or more network interfaces and configured to execute one or more processes; and
a memory configured to store a process that is executable by the processor, the process when executed configured to:
identify a power budget threshold to maintain existing mesh backhaul links in a mesh tree;
determine an estimated power budget among potential mesh backhaul links in the mesh tree;
perform a channel evaluation of each candidate channel available to establish a backhaul link in the mesh tree; and

16 reconfigure the mesh tree, in response to a modified power budget for the mesh tree, wherein reconfiguring is based on the estimated power budget and the channel evaluation.

12. The apparatus as in claim 11, wherein the power budget threshold is a minimum mandatory power budget to maintain the existing mesh backhaul links based on a spatial proximity between nodes of the existing mesh backhaul links in the mesh tree.

13. The apparatus as in claim 12, wherein the power budget threshold is calculated based on a rate verses range (RvR) throughput assessment of the nodes of the existing mesh backhaul links in the mesh tree.

14. The apparatus as in claim 12, wherein the minimum mandatory power budget to maintain the existing mesh backhaul links is identified based on a minimum signal to interference and noise ratio (SiNr) for the existing mesh backhaul links to meet application service level agreements (SLAs) between the nodes of the existing mesh backhaul links in the mesh tree.

15. The apparatus as in claim 11, wherein the estimated power budget among the potential mesh backhaul links in the mesh tree is based on a spatial proximity between nodes of non-existing mesh backhaul links in the mesh tree as determined from mesh beacons associated with the nodes.

16. The apparatus as in claim 11, wherein the estimated power budget among the potential mesh backhaul links in the mesh tree is based on a spatial proximity between nodes of non-existing mesh backhaul links in the mesh tree as determined from reverse path loss calculations based on at least one of a management frame or a control frame associated with the nodes.

17. The apparatus as in claim 11, wherein the process when executed is further configured to: perform the channel evaluation by assigning a frequency grade to each candidate channel, wherein the frequency grade is based on channel state information (CSI) metrics and allowed effective isotropic radiated power (EiRP) budgets for each candidate channel.

18. The apparatus as in claim 11, wherein the process when executed is further configured to:
perform the channel evaluation by deprioritizing a candidate channel for mesh backhaul candidacy selection in response to a determination that the candidate channel has an insufficient allowed effective isotropic radiated power (EiRP) budget to establish the backhaul link in the mesh tree.

19. The apparatus as in claim 11, wherein the process when executed is further configured to:
perform the channel evaluation by deprioritizing a candidate channel for mesh backhaul candidacy selection in response to a determination that the candidate channel has more than a threshold amount of variability to its allowed effective isotropic radiated power (EiRP) budget.

20. A tangible, non-transitory, computer-readable medium storing program instructions that cause a device to execute a process comprising:
identifying a power budget threshold to maintain existing mesh backhaul links in a mesh tree;
determining an estimated power budget among potential mesh backhaul links in the mesh tree;
performing a channel evaluation of each candidate channel available to establish a backhaul link in the mesh tree; and reconfiguring the mesh tree, in response to a modified power budget for the mesh tree, wherein reconfiguring is based on the estimated power budget and the channel evaluation.

* * * * *